US012811085B2

(12) United States Patent
Kiyota et al.

(10) Patent No.: US 12,811,085 B2
(45) Date of Patent: Nov. 24, 2026

(54) CIRCUIT PROTECTION COMPONENT AND ELECTRICAL JUNCTION BOX

(71) Applicant: YAZAKI CORPORATION, Tokyo (JP)

(72) Inventors: Hirotaka Kiyota, Makinohara (JP); Takeshi Onoda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 221 days.

(21) Appl. No.: 18/981,312

(22) Filed: Dec. 13, 2024

(65) Prior Publication Data

US 2025/0118521 A1 Apr. 10, 2025

Related U.S. Application Data

(63) Continuation of application No. PCT/JP2023/037619, filed on Oct. 18, 2023.

(30) Foreign Application Priority Data

Nov. 24, 2022 (JP) ................................ 2022-187142

(51) Int. Cl.
*H01H 85/50* (2006.01)
*H01H 85/20* (2006.01)
(Continued)

(52) U.S. Cl.
CPC ............ *H01H 85/50* (2013.01); *H01H 85/20* (2013.01); *H02G 3/081* (2013.01); *H02G 3/16* (2013.01); *H01H 2085/2075* (2013.01)

(58) Field of Classification Search
CPC .. H02G 3/081; H02G 3/16; H01H 2085/2075; H01H 85/20; H01H 85/50
See application file for complete search history.

(56) References Cited

U.S. PATENT DOCUMENTS

2006/0258186 A1* 11/2006 Egawa ................ H01R 13/518 439/76.2
2008/0261459 A1* 10/2008 Choi .................... H01R 9/2466 439/709

FOREIGN PATENT DOCUMENTS

JP 2014-93888 A 5/2014
KR 20100084891 A 7/2010
KR 101198620 B1 11/2012

OTHER PUBLICATIONS

International Search Report for PCT/JP2023/037619 dated Dec. 5, 2023.

* cited by examiner

*Primary Examiner* — Timothy J Thompson
*Assistant Examiner* — Rhadames Alonzo Miller
(74) *Attorney, Agent, or Firm* — KENEALY VAIDYA LLP

(57) ABSTRACT

What are included are a circuit protection member that is a member that cuts off an overcurrent between an external power supply and an external load between a power supply-side electric wire and a first load-side electric wire, the circuit protection member being capable of electrically connecting a first terminal part of an additional circuit protection component for cutting off an overcurrent between the external power supply and the additional external load to the external power supply, and an additional load-side electrical connection structure capable of electrically connecting a second load-side electrical wire electrically connected to the additional external load and a second terminal part of the additional circuit protection component, and the circuit protection member includes an additional electrical connection portion and a coupling portion, and at least one set of a combination of the additional electrical connection
(Continued)

portion and the additional load-side electrical connection structure is provided.

3 Claims, 12 Drawing Sheets

(51) Int. Cl.
*H02G 3/08* (2006.01)
*H02G 3/16* (2006.01)

CIRCUIT PROTECTION COMPONENT AND ELECTRICAL JUNCTION BOX

CROSS-REFERENCE TO RELATED APPLICATION

This application is a continuation application of International Application No. PCT/JP2023/037619 filed on Oct. 18, 2023 which claims the benefit of priority from Japanese Patent Application No. 2022-187142 filed on Nov. 24, 2022 and designating the U.S., the entire contents of which are incorporated herein by reference.

BACKGROUND OF THE INVENTION

1. Field of the Invention

The present invention relates to a circuit protection component and an electrical junction box.

2. Description of the Related Art

In the electrical junction box, a circuit protection component such as a fuse is interposed between an external power supply and a load. The circuit protection component is provided with a circuit protection part that interrupts energization between the external power supply and the external load when an overcurrent flows. For example, this type of electrical junction box is disclosed in Japanese Patent Application Laid-open No. 2014-93888.

By the way, the circuit protection component may be interposed between a plurality of external loads and the external power supply by providing a circuit protection part for each of the plurality of external loads. For example, a conventional circuit protection component includes a circuit protection member such as a bus bar provided with a power supply connection portion that causes a power supply-side electric wire electrically connected to an external power supply to be electrically connected, a load connection portion for each external load that causes a load-side electric wire electrically connected to the external load to be electrically connected, and a fusible portion as a circuit protection part interposed between the power supply connection portion and the load connection portion for each external load. That is, the conventional circuit protection component has a preset number of circuit protection parts, and cannot connect an external load added later.

SUMMARY OF THE INVENTION

Therefore, an object of the present invention is to provide a circuit protection component and an electrical junction box that can cope with the addition of an external load.

In order to achieve the above mentioned object, a circuit protection component according to one aspect of the present invention includes: a conductive circuit protection member that is a member that cuts off an overcurrent between an external power supply and an external load between the power supply-side electric wire electrically connected to the external power supply and a first load-side electric wire electrically connected to the external load, the conductive circuit protection member being capable of electrically connecting a first terminal part of an additional circuit protection component for cutting off an overcurrent between the external power supply and an additional external load to be added to the external power supply when the additional external load to be added is added; and an additional load-side electrical connection structure capable of electrically connecting a second load-side electrical wire electrically connected to the additional external load and a second terminal part of the additional circuit protection component when the additional external load is added, wherein the circuit protection member includes a power supply connection portion that causes the power supply-side electric wire to be electrically connected, a load connection portion that causes the first load-side electric wire to be electrically connected, a fusible portion interposed between the power supply connection portion and the load connection portion, an additional electrical connection portion that causes the first terminal part to be physically and electrically connected, and a coupling portion that couples the additional electrical connection portion to the power supply connection portion, and at least one set of a combination of the additional electrical connection portion and the additional load-side electrical connection structure is provided.

In order to achieve the above mentioned object, an electrical junction box according to another aspect of the present invention includes an electronic component; an internal conductive member that electrically connects the electronic component to an external power supply; a frame including a cylindrical wall provided with an opening at least at one end, and having a cylindrical portion that houses and holds the electronic component and the internal conductive member in an inside of the cylindrical portion; a cover member that closes the opening of the cylindrical portion; and a circuit protection component that cuts off an overcurrent between the external power supply and an external load, wherein the internal conductive member includes a first electrical connection portion and a second electrical connection portion that are physically and electrically connected to the electronic component in the inside of the cylindrical portion, the circuit protection component includes: a conductive circuit protection member that is a member that cuts off an overcurrent between the external power supply and the external load between a power supply-side electric wire electrically connected to the external power supply and a first load-side electric wire electrically connected to the external load, and is capable of electrically connecting a first terminal part of an additional circuit protection component for cutting off an overcurrent between the external power supply and an additional external load to be added to the external power supply; and an additional load-side electrical connection structure that electrically connects a second load-side electrical wire electrically connected to the additional external load and a second terminal part of the additional circuit protection component, the circuit protection member includes a power supply connection portion that causes the power supply-side electric wire to be electrically connected and causes the second electrical connection portion of the internal conductive member to be physically and electrically connected, a load connection portion that causes the first load-side electric wire to be electrically connected, a fusible portion interposed between the power supply connection portion and the load connection portion, an additional electrical connection portion that causes the first terminal portion to be physically and electrically connected, and a coupling portion that couples the additional electrical connection portion to the power supply connection portion, and at least one set of a combination of the additional electrical connection portion and the additional load-side electrical connection structure is provided.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of the circuit protection component and the electrical junction box according to the present invention will be described in detail with reference to the drawings. Note that the present invention is not limited by the embodiment.

Embodiment

An embodiment of the circuit protection component and the electrical junction box according to the present invention will be described with reference to FIGS. 1 to 13.

Figure 1:
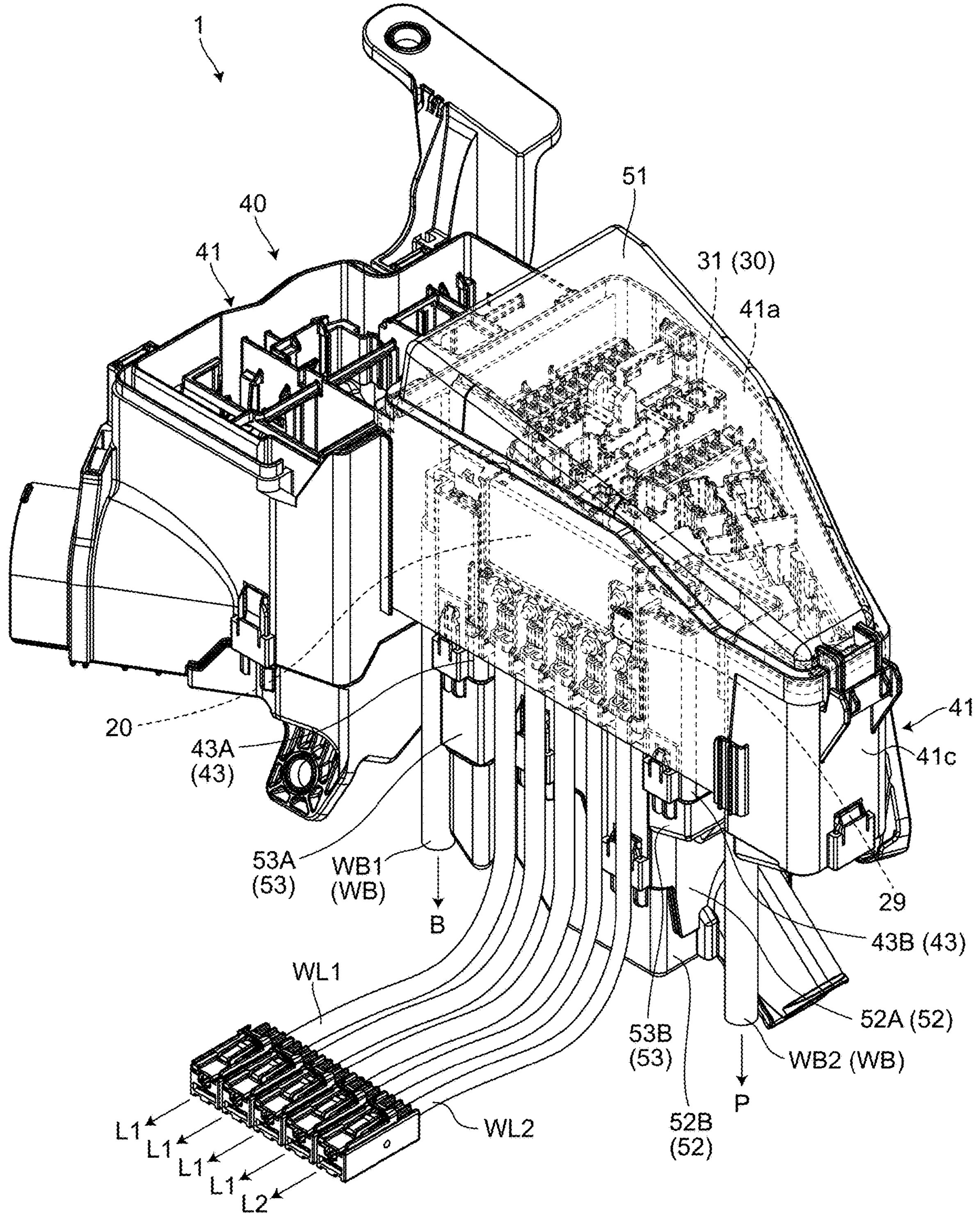
FIG. 1 is a perspective view illustrating a circuit protection component and an electrical junction box according to an embodiment.
Figure 2:
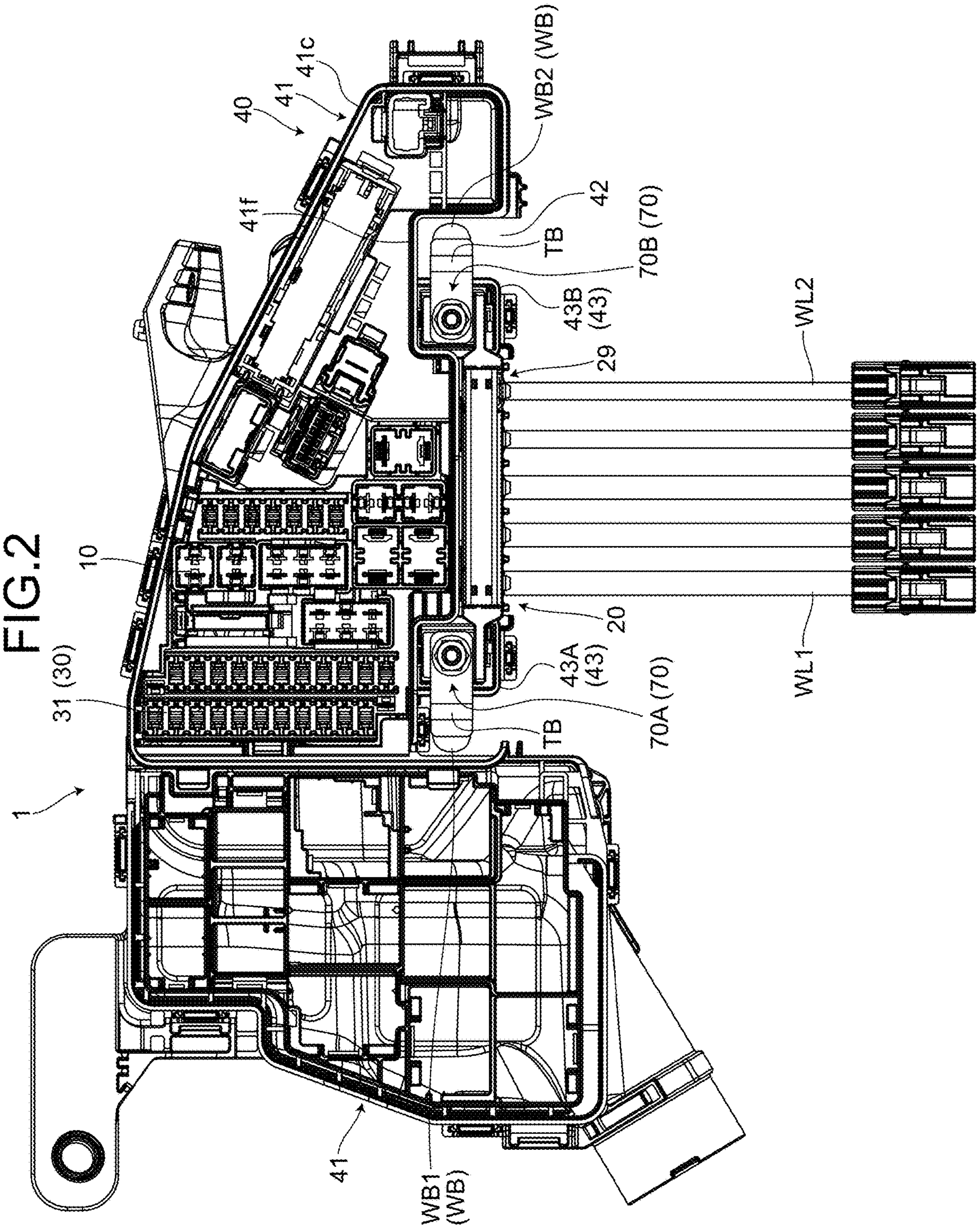
FIG. 2 is a plan view of the circuit protection component and the electrical junction box (without a first cover member) according to the embodiment as viewed from one opening side of a frame.

Reference numeral 1 in FIGS. 1 to 4 denotes an electrical junction box of the present embodiment. This electrical junction box 1 is mounted on a vehicle such as an automobile, and is interposed between an external power supply B such as a secondary battery in the vehicle and an external load L1 such as a power distribution target (for example, auxiliary machinery to be supplied, and the like), thereby supplying power of the external power supply B to the external load L1 (FIG. 1). In addition, the electrical junction box 1 can also correspond to an external load retrofitted to the vehicle, that is, the additional external load L2 to be added. When the additional external load L2 is added to the vehicle, the electrical junction box 1 is interposed between the external power supply B and the additional external load L2 to supply power of the external power supply B to the additional external load L2 (FIG. 1).

The electrical junction box 1 includes an electronic component 10 such as a relay or a fuse (FIG. 2), and the electronic component 10 is interposed between the external power supply B and the external load L1. In addition, in the electrical junction box 1, when the additional external load L2 is added to the vehicle, the electronic component 10 is interposed between the external power supply B and the additional external load L2. Further, the electrical junction box 1 includes a circuit protection component 20 different from the fuse, and the circuit protection component 20 is interposed between the external power supply B and the external load L1 (FIGS. 1 to 4). Then, in the electrical junction box 1, when the additional external load L2 is added to the vehicle, the circuit protection component 20 is interposed also between the external power supply B and the additional external load L2 (FIGS. 1 to 4). The electrical junction box 1 includes a plurality of electronic components 10 and at least one circuit protection component 20.

Figure 3:
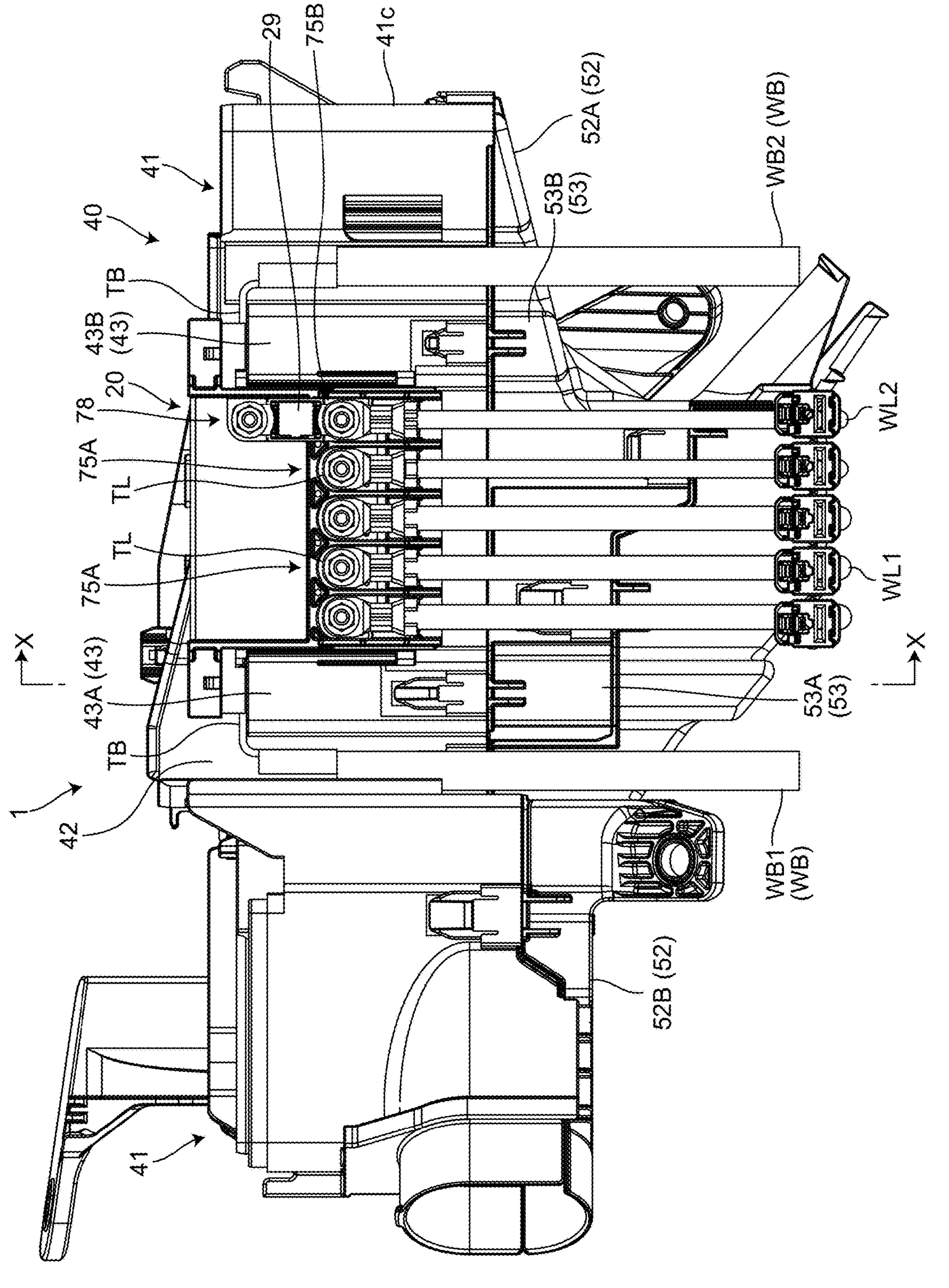
FIG. 3 is a plan view of the circuit protection component and the electrical junction box (without the first cover member) according to the embodiment as viewed from the lateral side of the frame.
Figure 4:
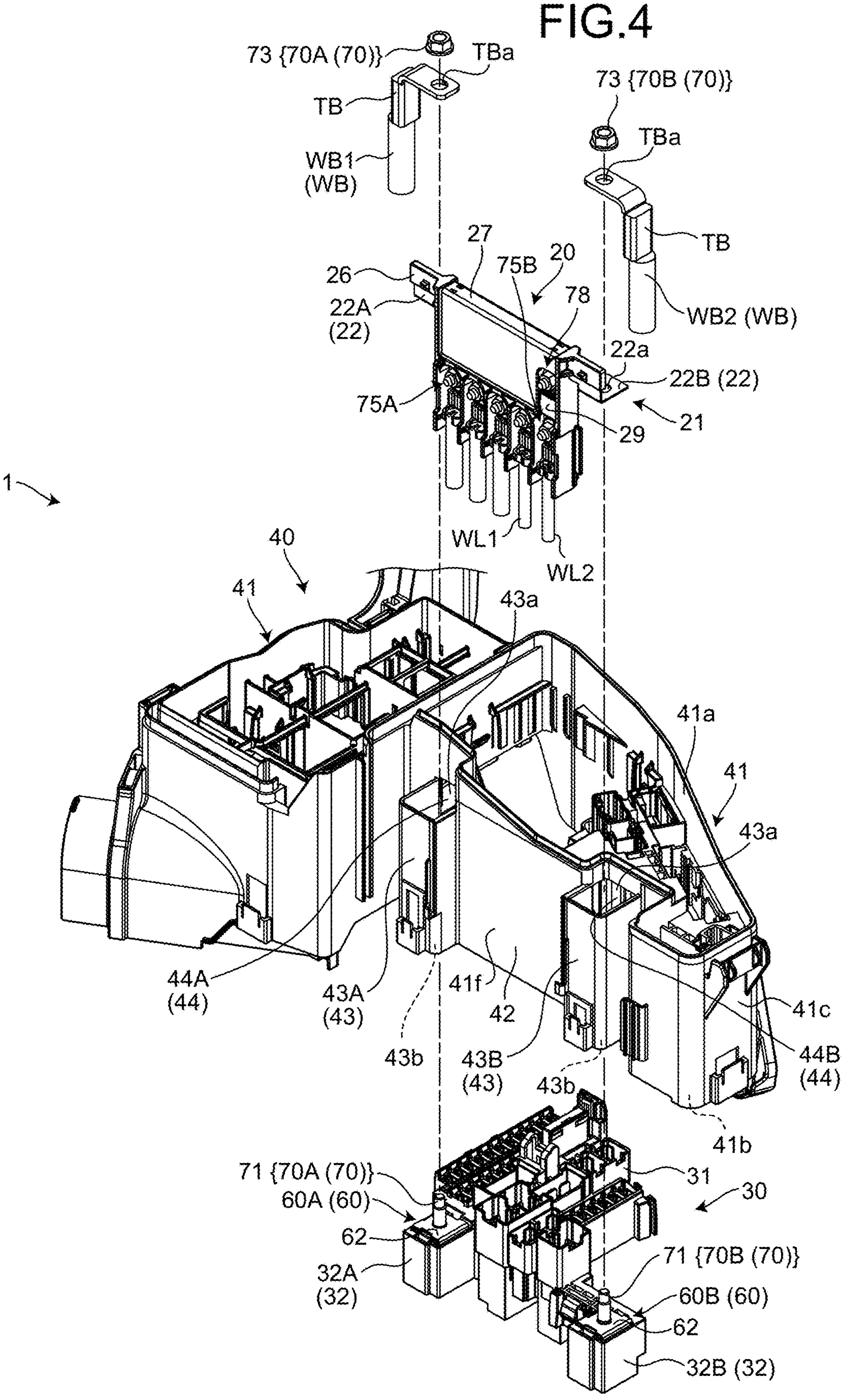
FIG. 4 is an exploded perspective view illustrating the circuit protection component and the electrical junction box (without the first cover member and a second cover member) according to the embodiment.
Figure 5:
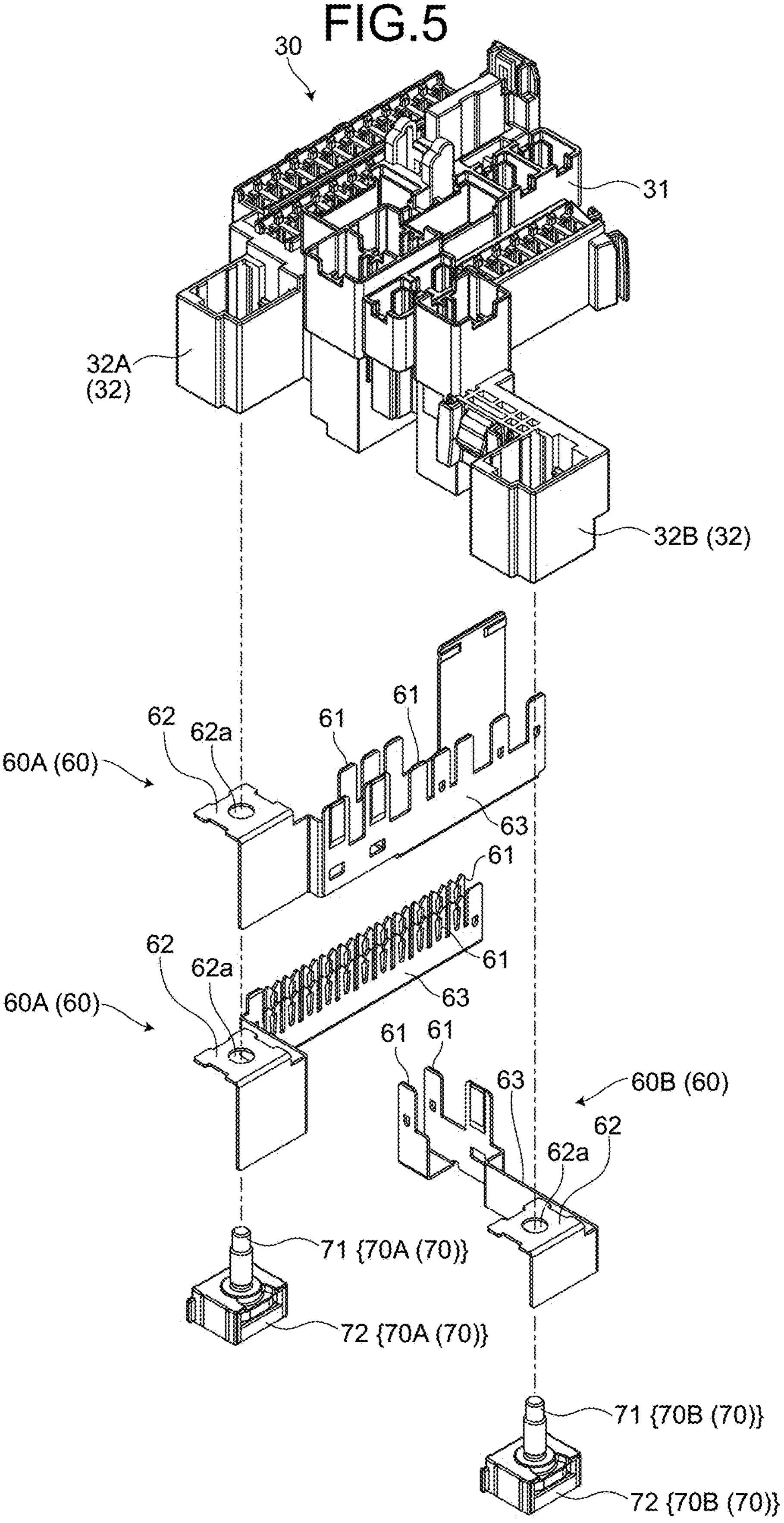
FIG. 5 is an exploded perspective view illustrating a block, and an internal conductive member and a male screw member accommodated in the block.
Figure 6:
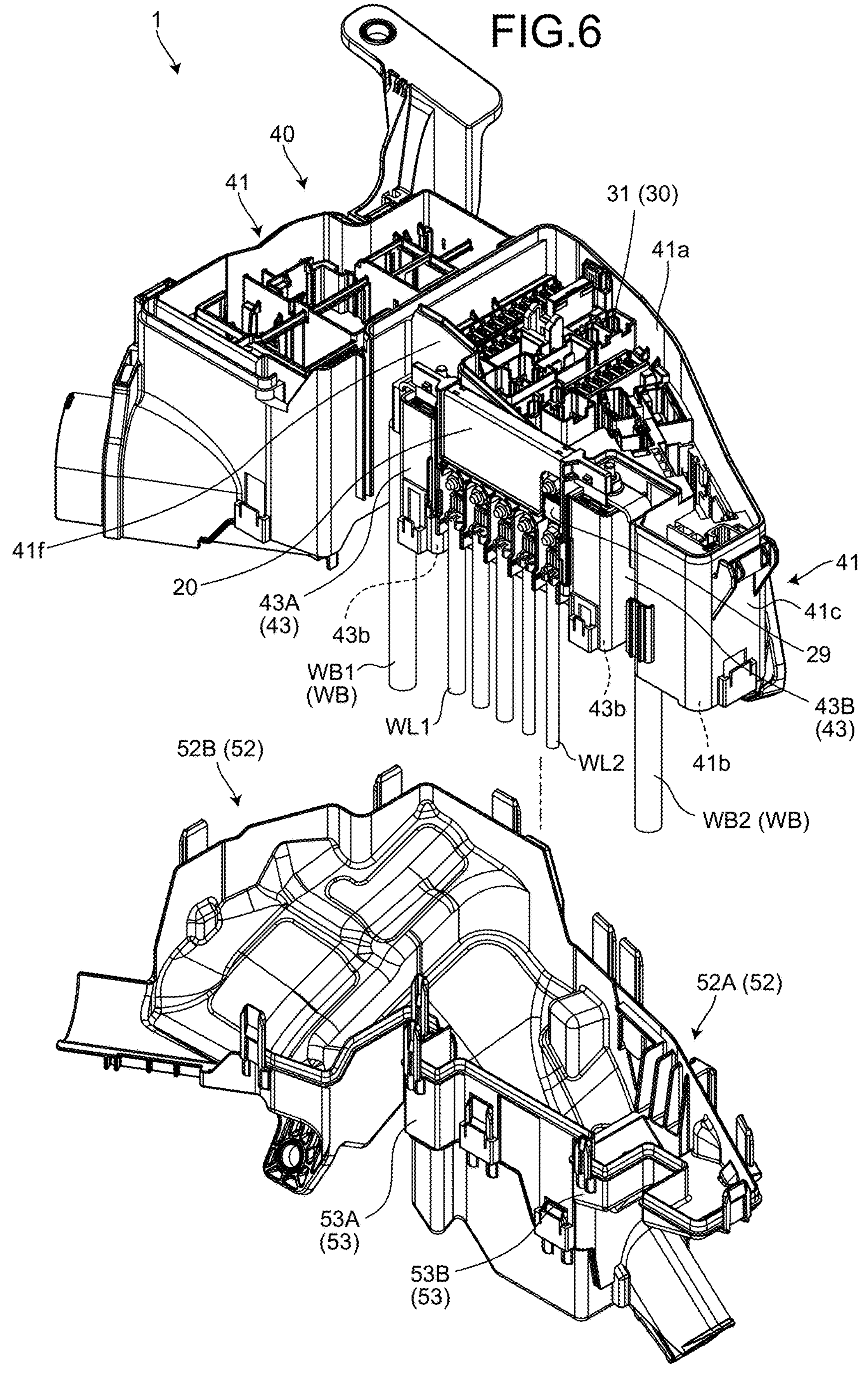
FIG. 6 is an exploded perspective view of a frame and the second cover member in the electrical junction box (without the first cover member) according to the embodiment.

The electrical junction box 1 includes a block 30 that holds the electronic component 10, and a frame 40 having a cylindrical portion 41 formed of a cylindrical wall 41*c* of both end openings (opening 41*a* and 41*b*) that houses and holds the block 30 in the inside of the cylindrical portion 41 (FIGS. 1 to 6). The electrical junction box 1 includes a cover member (hereinafter, referred to as the "first cover member") 51 that closes one opening 41*a* of the cylindrical portion 41 and a cover member (hereinafter, referred to as the "second cover member") 52 that closes the other opening 41*b* of the cylindrical portion 41 (FIGS. 1, 3, and 6). The block 30, the frame 40, the first cover member 51, and the second cover member 52 are formed of an insulating material such as synthetic resin.

In the electrical junction box 1, a housing is configured by the frame 40, the first cover member 51, and the second cover member 52, and an electric wire (not illustrated) electrically connected to the electronic component 10 is drawn in the housing and drawn out from the opening to the outside of the housing.

In the frame 40, the block 30 is inserted into the inside of the cylindrical portion 41 from the other opening 41*b*. In a case where the frame 40 is configured by one cylindrical portion 41, the entire outer wall forming the outer frame is formed by the cylindrical wall 41*c* of the cylindrical portion 41. In addition, when the frame 40 is configured by a combination of a plurality of cylindrical portions 41 in which the opening direction of one opening 41*a* is matched with each other and the opening direction of the other opening 41*b* is matched with each other, the outer wall forming the outer frame is formed by a combination of some of the cylindrical walls 41*c* of the plurality of cylindrical portions 41. That is, the outer wall forming the outer frame of the frame 40 is entirely or partially formed by the cylindrical wall 41*c* of the cylindrical portion 41.

The frame 40 illustrated here is a combination of two cylindrical portions 41, and is mounted on the vehicle with one opening 41*a* facing the upper side of the vehicle. The first cover member 51 illustrated here is provided for each of the cylindrical portions 41. In addition, the second cover member 52 illustrated here is divided into a first divided cover 52A and a second divided cover 52B assembled with each other, and closes the other opening 41*b* of each of the two cylindrical portions 41 in a form in which the first divided cover 52A and the second divided cover 52B are assembled (FIGS. 1, 3, and 6).

The electrical junction box 1 includes an internal conductive member 60 that electrically connects the electronic component 10 to the external power supply B and is held by the block 30 together with the electronic component 10 (FIGS. 4 and 5). The internal conductive member 60 includes a first electrical connection portion 61 that is physically and electrically connected to the electronic component 10 in the inside of the cylindrical portion 41 (FIG. 5). The first electrical connection portion 61 is provided for each electronic component 10. In addition, the internal conductive member 60 includes a second electrical connection portion 62 electrically connected to the external power supply B (FIGS. 4 and 5). In the internal conductive member 60, the plurality of first electrical connection portions 61 and the second electrical connection portion 62 are connected by a coupling portion 63 (FIG. 5).

Here, as will be described later, in the electrical junction box 1, the circuit protection component 20 is disposed outside the frame 40 and outside the cylindrical portion 41. Therefore, the internal conductive member 60 illustrated here adopts a shape in which the coupling portion 63 is extended to the outside of the cylinder of the cylindrical portion 41, and the second electrical connection portion 62 is coupled to the coupling portion 63 outside the extended frame 40. That is, the second electrical connection portion 62 illustrated here is disposed outside the frame 40 and outside the cylindrical portion 41.

The internal conductive member 60 is a so-called bus bar, and is formed in a plate shape using a metal plate as a base material, for example. The block 30 includes a block body 31 that holds the electronic component 10 and the internal conductive member 60 in the inside of the cylindrical portion 41 (FIGS. 1, 2, and 4 to 6).

Note that the electrical junction box 1 may include the frame 40 integrated with the block 30. The frame 40 includes a cylindrical wall 41*c* having an opening 41*a* at least at one end, and has a cylindrical portion 41 that accommodates and holds the electronic component 10 and the internal conductive member 60 in the inside of the cylindrical portion 41. For example, the electrical junction box 1 includes the first cover member 51 and the second cover member 52 as in the above example if the frame 40 has the cylindrical portion 41 including the cylindrical wall 41*c* having both end openings (opening 41*a* and 41*b*). On the other hand, the electrical junction box 1 includes only the first cover member 51 if the frame 40 has the cylindrical portion 41 including the cylindrical wall 41*c* having the opening 41*a* only (that is, the cylindrical portion 41 in which the opening 41*b* is closed).

The circuit protection component 20 is a component provided in the electrical junction box 1 in order to cut off an overcurrent between the external power supply B and the external load L1. Further, the circuit protection component 20 is configured to be able to cut off an overcurrent between the external power supply B and the additional external load L2 when the additional external load L2 is added to the vehicle. The circuit protection component 20 may be disposed in the inside of the cylindrical portion 41 or may be disposed outside the frame 40 and outside the cylindrical portion 41. That is, the circuit protection component 20 illustrated here is disposed outside the frame 40 and outside the cylinder of the cylindrical portion 41.

The circuit protection component 20 is a member interposed between the power supply-side electric wire WB electrically connected to the external power supply B and the first load-side electric wire WL1 electrically connected to the external load L1, and includes a conductive circuit protection member 21 that cuts off an overcurrent between the external power supply B and the external load L1 between the power supply-side electric wire WB and the first load-side electric wire WL1 (FIGS. 4 and 7 to 10). The circuit protection member 21 is provided to cut off an overcurrent between the external power supply B and at least one of the external load L1. The circuit protection member 21 illustrated here is provided to cut off an overcurrent between the external power supply B and the four external loads L1, and includes four sets of combinations of the following load connection portion 23 and fusible portion 24.

Figure 7:
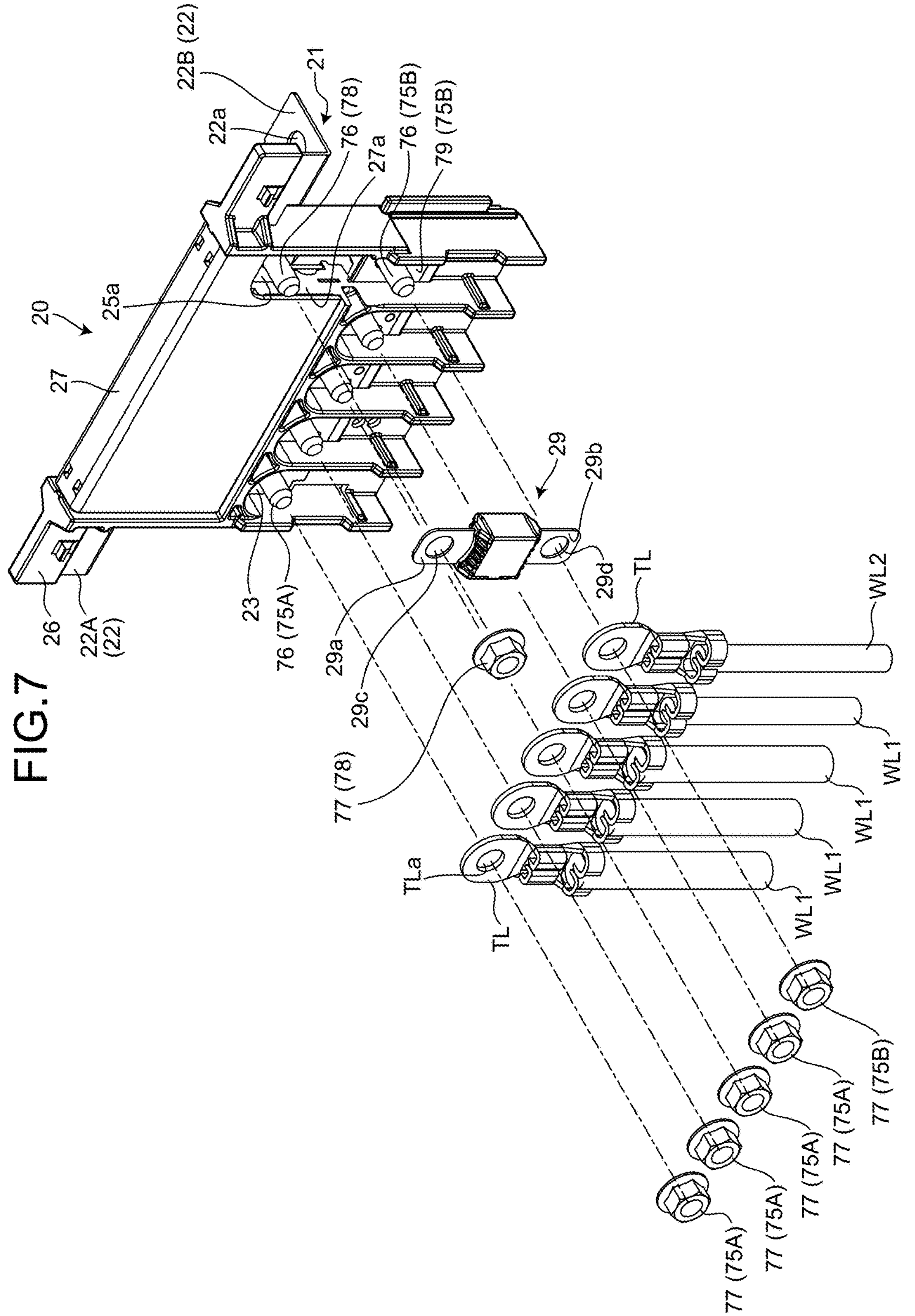
FIG. 7 is an exploded perspective view for explaining a circuit protection component and an electrical connection structure on a load side.
Figure 10:
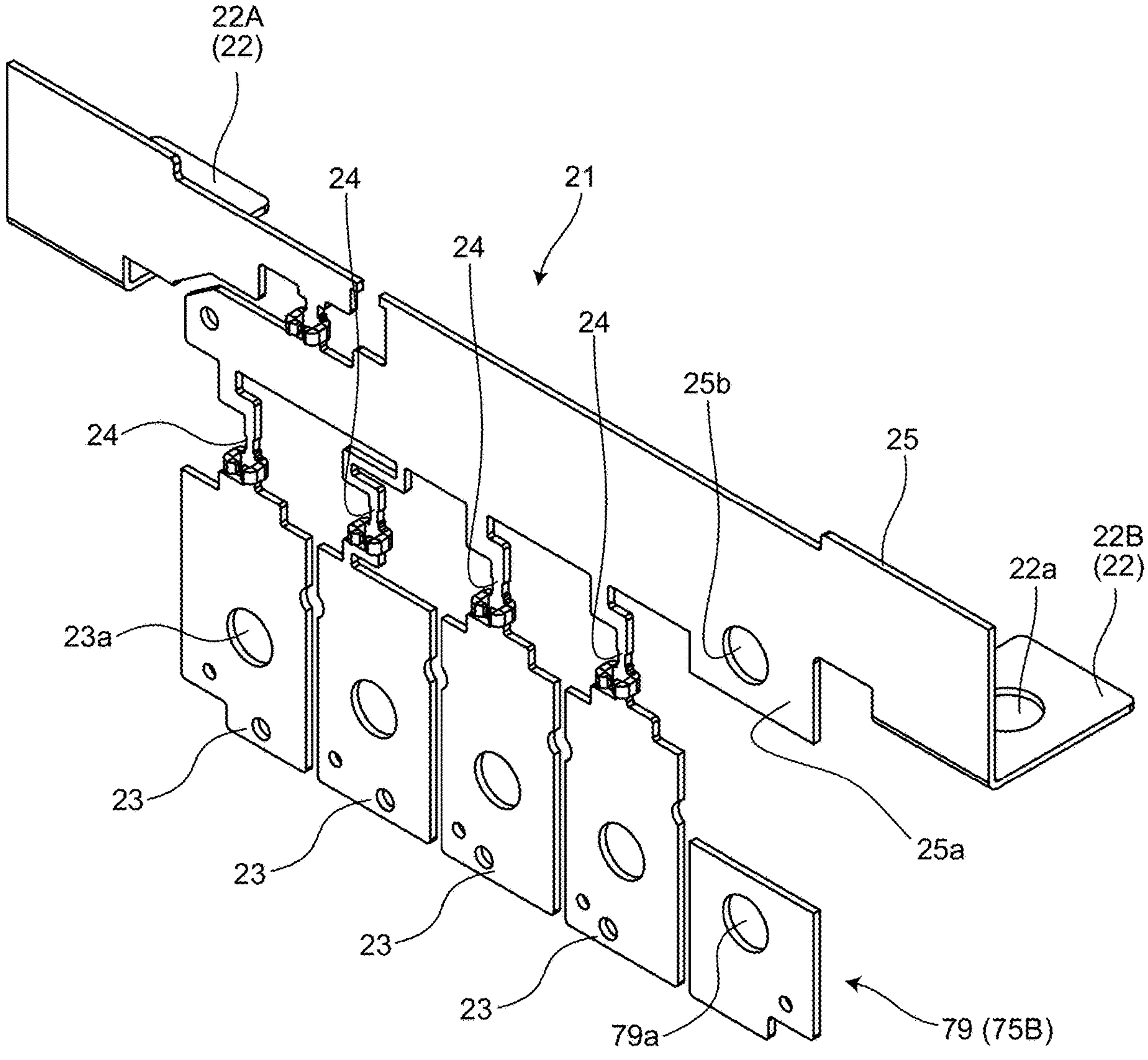
FIG. 10 is a perspective view illustrating a circuit protection member.

The circuit protection member 21 includes a power supply connection portion 22 that causes the power supply-side electric wire WB to be electrically connected (FIGS. 4, 7, and 10). A power supply-side terminal fitting TB at an end of the power supply-side electric wire WB and the second electrical connection portion 62 of the internal conductive member 60 are physically and electrically connected to the power supply connection portion 22 illustrated here.

In addition, the circuit protection member 21 includes a load connection portion 23 that causes the first load-side electric wire WL1 to be electrically connected, and a fusible portion 24 that is interposed between the power supply connection portion 22 and the load connection portion 23 and is fused when an overcurrent flows (FIGS. 7 and 10). In the circuit protection member 21, the load connection portion 23 and the fusible portion 24 are provided for each external load L1. Then, the circuit protection member 21 includes a coupling portion 25 that couples the power supply connection portion 22 and the fusible portion 24 (FIG. 10). The power supply connection portion 22 and the fusible portion 24 for each external load L1 are coupled to the coupling portion 25.

The circuit protection member 21 is a so-called bus bar, and is formed in a plate shape using a metal plate as a base material, for example. In the circuit protection component 20, a resin portion 26 is integrally molded with the circuit protection member 21 using a synthetic resin material in a state where the power supply connection portion 22, the load connection portion 23, and the fusible portion 24 are exposed (FIGS. 4 and 7 to 9). Then, in the circuit protection component 20, a transparent resin cover 27 made of a synthetic resin material that covers the exposed fusible portion 24 is assembled to the resin portion 26 (FIGS. 4 and 7 to 9).

The circuit protection component 20 includes a power supply-side electrical connection structure 70 that electrically connects the power supply-side electric wire WB, the internal conductive member 60, and the circuit protection member 21 (FIGS. 2, 4, 5, and 11). The power supply-side electrical connection structure 70 is disposed outside the frame 40 and outside the cylindrical portion 41. Therefore, the power supply-side electrical connection structure 70 electrically connects the power supply-side electric wire WB, the internal conductive member 60, and the circuit protection member 21 outside the frame 40. The power supply-side electrical connection structure 70 illustrated here physically and electrically connects the power supply-side terminal fitting TB at an end of the power supply-side electric wire WB, the second electrical connection portion 62 of the internal conductive member 60, and the power supply connection portion 22 of the circuit protection member 21 outside the frame 40.

Figure 11:
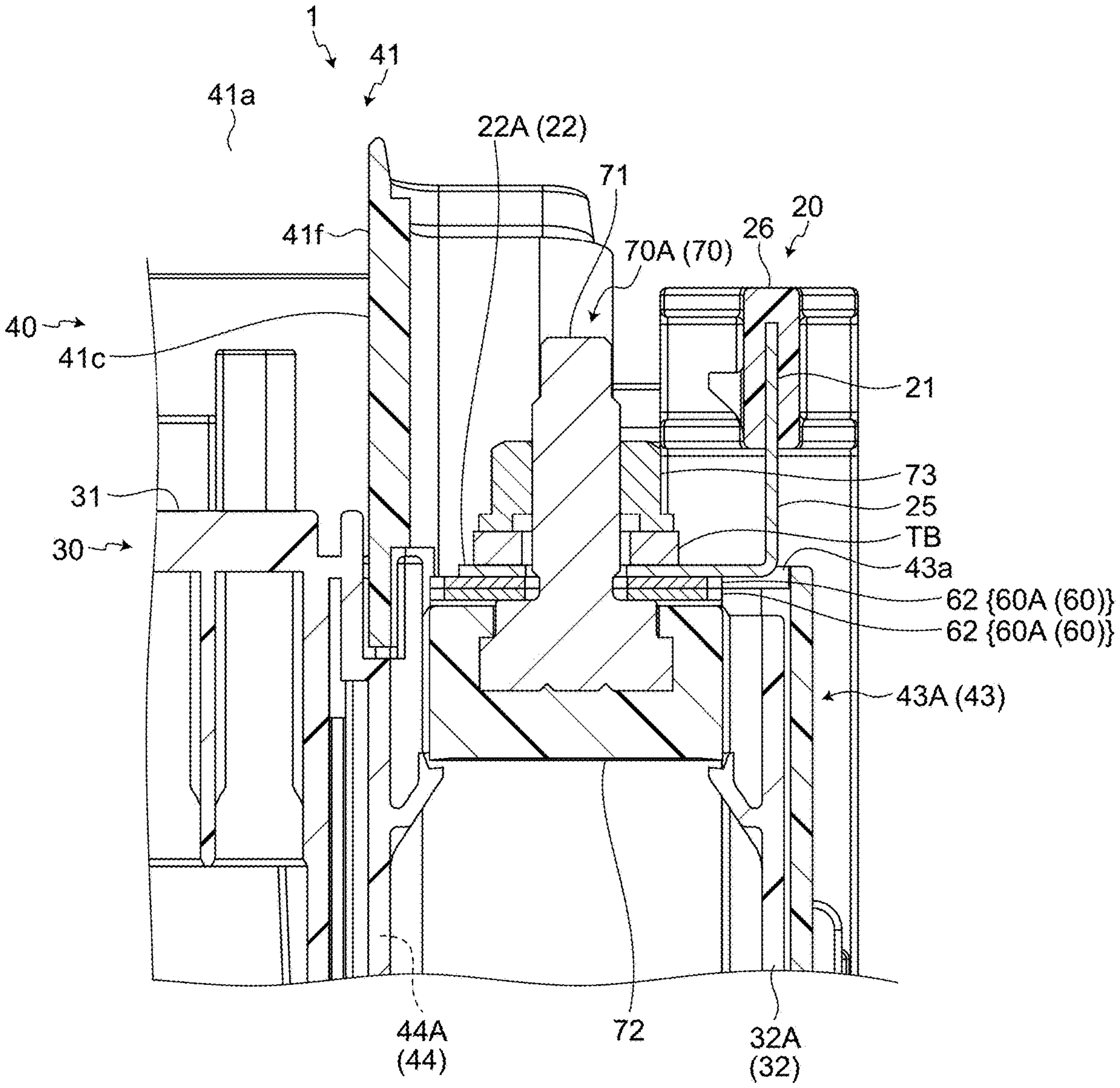
FIG. 11 is a cross-sectional view taken along line X-X of FIG. 3.
Figure 12:
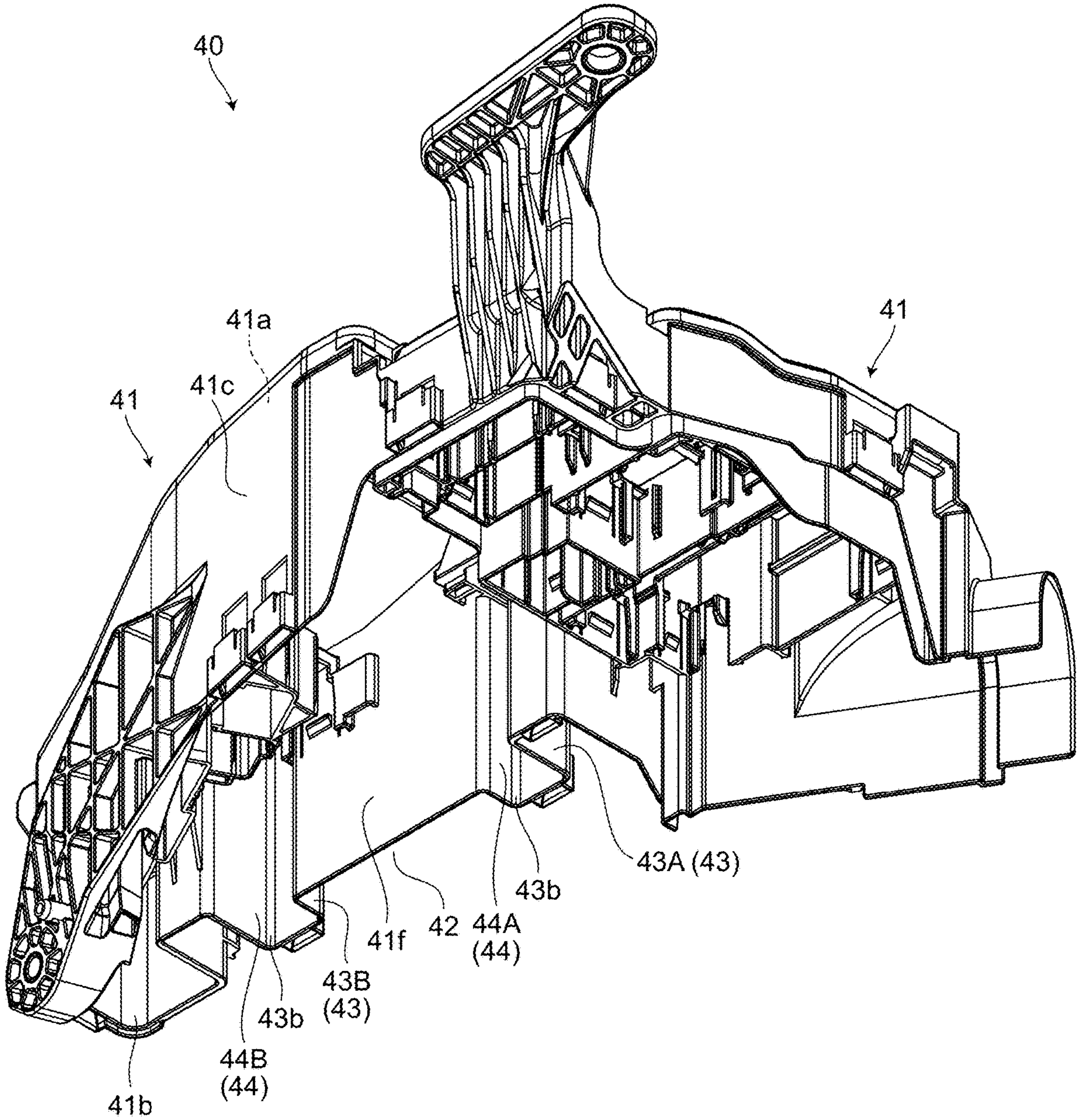
FIG. 12 is a perspective view illustrating the frame.
Figure 13:
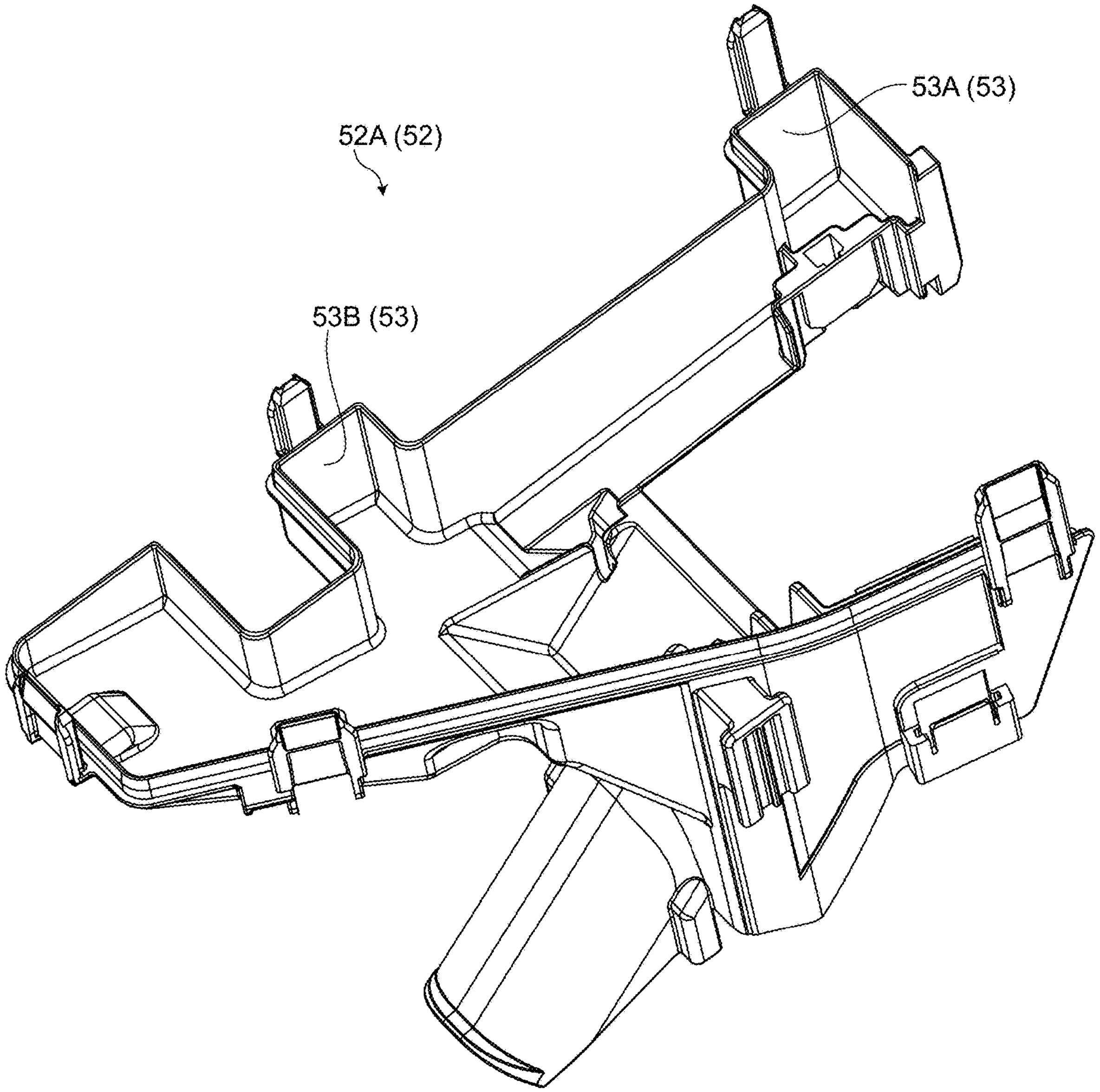
FIG. 13 is a perspective view illustrating a first divided cover.

The power supply-side electrical connection structure 70 adopts a connection structure to physically connect the power supply-side terminal fitting TB at an end of the power supply-side electric wire WB, the second electrical connection portion 62 of the internal conductive member 60, and the power supply connection portion 22 of the circuit protection member 21. The power supply-side electrical connection structure 70 illustrated here is a connection structure for detachably and physically connecting the power supply-side terminal fitting TB to the second electrical connection portion 62 and the power supply connection portion 22, and includes a male screw member 71, a screw holding member 72 for holding the male screw member 71 in a state where the male screw portion is exposed, and a female screw member 73 to be screwed to the male screw portion of the male screw member 71 (FIGS. 4, 5, and 11). In the power supply-side electrical connection structure 70, the male screw portion of the male screw member 71 is inserted into the through-holes TBa, 62*a*, and 22*a* provided in the power supply-side terminal fitting TB, the second electrical connection portion 62 of the internal conductive member 60, and the power supply connection portion 22 of the circuit protection member 21, respectively, and the female screw member 73 is screwed into the male screw portion, whereby the power supply-side terminal fitting TB, the second electrical connection portion 62 of the internal conductive member 60, and the power supply connection portion 22 of the circuit protection member 21 are jointly fastened and fixed (FIGS. 4 and 5). That is, the power supply-side electrical connection structure 70 is a jointly fastening/fixing structure in which the power supply-side terminal fitting TB, the second electrical connection portion 62, and the power supply connection portion 22 are screwed and fixed by the male screw member 71 and the female screw member 73.

Here, in the power supply-side electrical connection structure 70, the male screw member 71 is disposed such that the screw axis of the male screw portion is aligned with the vertical direction (that is, the vehicle vertical direction) and the male screw portion protrudes from the screw holding member 72 vertically upward (that is, above the vehicle).

In addition, the circuit protection component 20 includes a load-side electrical connection structure 75A that electrically connects the first load-side electric wire WL1 and the circuit protection member 21 (FIGS. 3, 4, and 7 to 9). The load-side electrical connection structure 75A is disposed outside the frame 40 and outside the cylindrical portion 41. Therefore, the load-side electrical connection structure 75A electrically connects the first load-side electric wire WL1 and the circuit protection member 21 outside the frame 40. A load-side terminal fitting TL is attached to an end of the first load-side electric wire WL1 (FIGS. 3 and 7 to 9). The load-side electrical connection structure 75A physically and electrically connects the load-side terminal fitting TL and the load connection portion 23 of the circuit protection member 21 outside the frame 40. When there is a plurality of external loads L1, the load-side electrical connection structure 75A is provided for each external load L1.

The load-side electrical connection structure 75A adopts a connection structure that physically connects the load-side terminal fitting TL at an end of the first load-side electric wire WL1 to the load connection portion 23 of the circuit protection member 21. The load-side electrical connection structure 75A illustrated here is a connection structure that detachably and physically connects the load-side terminal fitting TL to the load connection portion 23, and includes a male screw member 76 and a female screw member 77 to be screwed to a male screw portion of the male screw member 76 (FIG. 7). The resin portion 26 is integrally molded with the male screw member 76 in a state where a male screw portion of the male screw member 76 is inserted into a through hole 23*a* (FIG. 8) of the load connection portion 23 of the circuit protection member 21 and the male screw portion is exposed. In the load-side electrical connection structure 75A, a male screw portion of the male screw member 76 is inserted into a through hole TLa provided in the load-side terminal fitting TL, and a female screw member 77 is screwed into the male screw portion, whereby the load-side terminal fitting TL and the load connection portion 23 of the circuit protection member 21 are jointly fastened and fixed (FIG. 7). That is, the load-side electrical connection structure 75A is a jointly fastening/fixing structure in which the load-side terminal fitting TL and the load connection portion 23 are screwed and fixed by the male screw member 76 and the female screw member 77.

Here, in the load-side electrical connection structure 75A, the male screw member 76 is arranged in a form in which the male screw portion protrudes toward the side opposite to a side of the cylindrical wall 41*c* of the cylindrical portion 41 (FIGS. 4 and 6 to 9). For example, the cylindrical wall 41*c* of the cylindrical portion 41 has an opposing wall body 41*f* arranged to face the circuit protection component 20 outside the cylinder (FIGS. 2, 4, 5, 11, and 12). In the electrical junction box 1, the circuit protection component 20 is disposed in a state where the load connection portion 23 is exposed to the side opposite to a side of the opposing wall body 41*f*. In the load-side electrical connection structure 75A, the male screw member 76 is disposed such that the male screw portion protrudes from the through hole 23*a* of the load connection portion 23 to the opposite side of the opposing wall body 41*f*. That is, the load-side electrical connection structure 75A is a connection structure in which the load-side terminal fitting TL at an end of the first load-side electric wire WL1 is detachably and physically connected to the load connection portion 23 of the circuit protection member 21 on the opposite side to the opposing wall body 41*f* side (in other words, a visible location outside the frame 40), and these can be screwed and fixed by the male screw member 76 and the female screw member 77 on the opposite side to the opposing wall body 41*f* side. Therefore, in the load-side electrical connection structure 75A, the female screw member 77 is attached to and detached from the male screw member 76 while the circuit protection component 20 is assembled to the frame 40, so that the first load-side electric wire WL1 with the load-side terminal fitting TL can be attached to and detached from the load connection portion 23 of the circuit protection member 21.

In this example, the male screw member 76 is disposed such that a screw axis of the male screw portion is aligned with a direction orthogonal to the vertical direction (that is, the vehicle vertical direction), and the male screw portion protrudes toward a side opposite to the opposing wall body 41*f*.

Further, in the load-side electrical connection structure 75A, if the attachment and detachment of the first load-side electric wire WL1 with the load-side terminal fitting TL is not performed while the circuit protection component 20 is assembled to the frame 40, the male screw member 76 may be arranged such that the male screw portion protrudes toward the cylindrical wall 41*c* side (that is, the opposing wall body 41*f* side) of the cylindrical portion 41 (not illustrated).

In consideration of the case where the additional external load L2 is added to the vehicle, the circuit protection component 20 is configured to have a structure in which an additional circuit protection component 29 (FIGS. 1 to 4 and FIGS. 6 to 9) for cutting off the overcurrent can be retrofitted in order to cut off the overcurrent between the external power supply B and the additional external load L2, as well. The additional circuit protection component 29 is a circuit protection portion detachably attached to the circuit protection component 20, and a circuit protection part (not illustrated) such as a fusible portion is interposed between a first terminal part 29*a* at one end and a second terminal part 29*b* at the other end. In the additional circuit protection component 29, the first terminal part 29*a*, the second terminal part 29*b*, and the circuit protection part are provided on a plate-like circuit protection member such as a bus bar.

Figure 8:
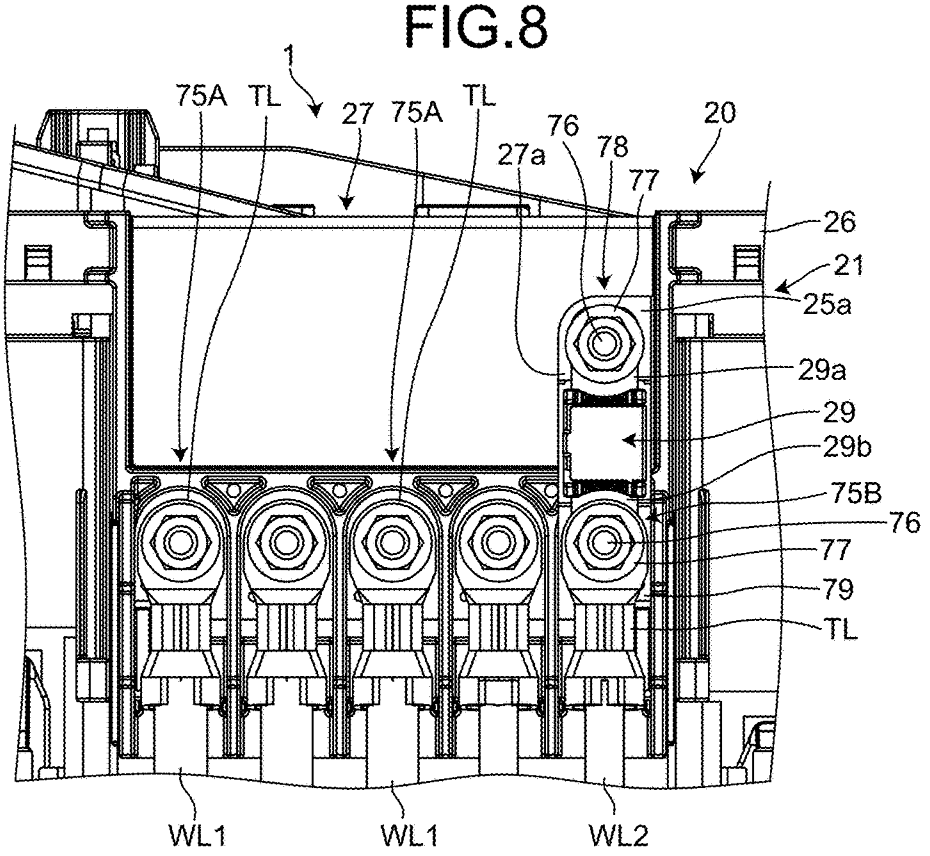
FIG. 8 is a plan view of the circuit protection part and the electrical connection structure on the load side as viewed from the lateral side of the frame of the electrical junction box, and illustrates a state in which the additional circuit protection component is assembled.
Figure 9:
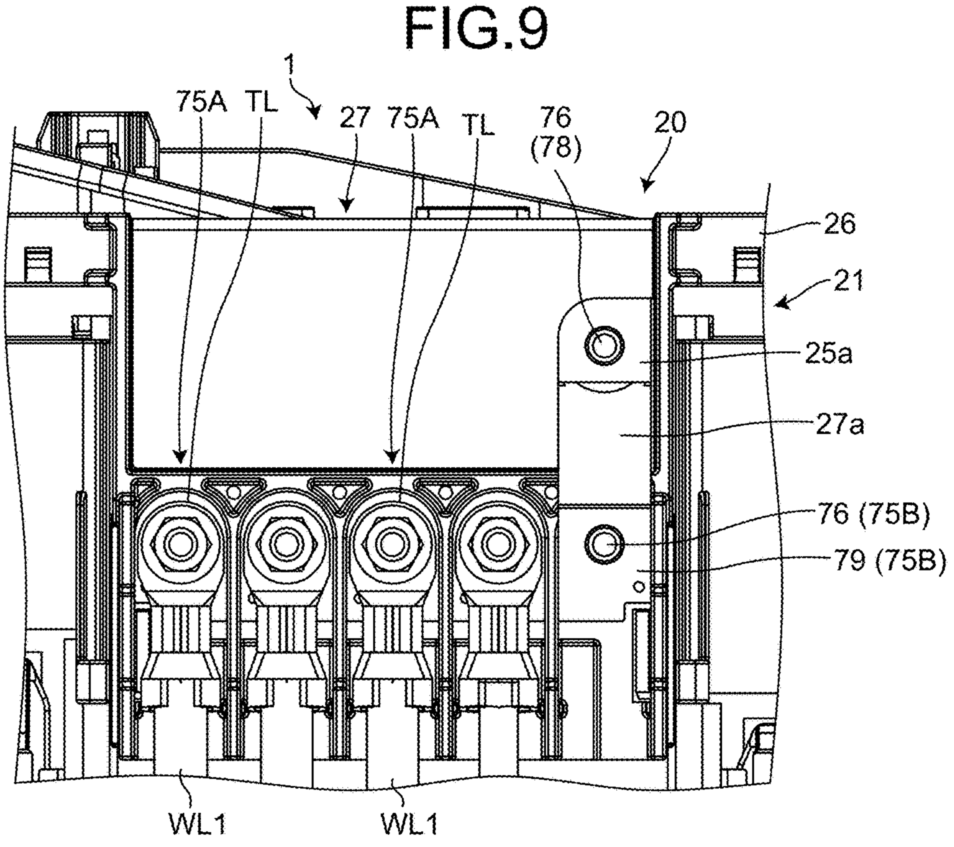
FIG. 9 is a plan view of the circuit protection part and the electrical connection structure on the load side as viewed from the lateral side of the frame of the electrical junction box, and illustrates a state in which the additional circuit protection component is removed.

First, the circuit protection member 21 is configured to electrically connect the first terminal part 29*a* of the additional circuit protection component 29 to the external power supply B (FIGS. 1 to 4 and FIGS. 6 to 9). The circuit protection member 21 includes an additional electrical connection portion 25*a* that causes the first terminal part 29*a* of the additional circuit protection component 29 to be physically and electrically connected (FIGS. 7 to 10). In the circuit protection member 21, the additional electrical connection portion 25*a* is electrically connected to the external power supply B by coupling the additional electrical connection portion 25*a* to the power supply connection portion 22. Here, the additional electrical connection portion 25*a* is provided in the coupling portion 25, and the additional electrical connection portion 25*a* is exposed from the resin portion 26. Furthermore, here, after the additional electrical connection portion 25*a* is exposed to the outside, a notch 27*a* is provided in the resin cover 27 in order to physically and electrically connect the first terminal part 29*a* of the additional circuit protection component 29 to the additional electrical connection portion 25*a* (FIGS. 7 to 9).

When the additional external load L2 is added, the circuit protection component 20 includes the additional power supply-side electrical connection structure 78 capable of electrically connecting the first terminal part 29*a* of the additional circuit protection component 29 corresponding to the additional external load L2 and the circuit protection member 21 (FIGS. 3, 4, and 7 to 9). The additional power supply-side electrical connection structure 78 is disposed outside the frame and 40 outside the cylindrical portion 41. Therefore, the additional power supply-side electrical connection structure 78 electrically connects the first terminal part 29*a* of the additional circuit protection component 29 and the circuit protection member 21 outside the frame 40. In the additional power supply-side electrical connection structure 78 illustrated here, the first terminal part 29*a* of the additional circuit protection component 29 and the additional electrical connection portion 25*a* of the circuit protection member 21 are physically and electrically connected outside the frame 40. When there is a plurality of additional external loads L2, the additional power supply-side electrical connection structure 78 is provided for each additional external load L2.

The additional power supply-side electrical connection structure 78 adopts a connection structure in which the first terminal part 29*a* of the additional circuit protection component 29 is detachably and physically connected to the additional electrical connection portion 25*a* of the circuit protection member 21. The additional power supply-side electrical connection structure 78 illustrated here includes the same male screw member 76 and female screw member 77 as the load-side electrical connection structure 75A (FIGS. 7 to 9). The male screw portion of the male screw member 76 is inserted into a through hole 25*b* of the additional electrical connection portion 25*a* (FIG. 10). The resin portion 26 is integrally molded with the male screw member 76 and the additional electrical connection portion 25*a* in a state where the additional electrical connection portion 25*a* is exposed and the male screw portion of the male screw member 76 inserted into the through hole 25*b* of the additional electrical connection portion 25*a* is exposed.

In the additional power supply-side electrical connection structure 78, the male screw portion of the male screw member 76 is inserted into a through hole 29*c* of the first terminal part 29*a* of the additional circuit protection component 29, and the female screw member 77 is screwed into the male screw portion to jointly fasten and fix the first terminal part 29*a* and the additional electrical connection portion 25*a* of the circuit protection member 21 (FIG. 7). That is, the additional power supply-side electrical connection structure 78 is a jointly fastening/fixing structure in which the first terminal part 29*a* and the additional electrical connection portion 25*a* are screwed and fixed by the male screw member 76 and the female screw member 77.

Next, when the additional external load L2 is added, the circuit protection component 20 includes an additional load-side electrical connection structure 75B capable of electrically connecting the second load-side electric wire WL2 electrically connected to the additional external load L2 and the second terminal part 29*b* of the additional circuit protection component 29 (FIGS. 3, 4, and 7 to 9). The additional load-side electrical connection structure 75B is disposed outside the frame 40 and outside the cylindrical portion 41. Therefore, the additional load-side electrical connection structure 75B electrically connects the second load-side electric wire WL2 and the second terminal part 29*b* of the additional circuit protection component 29 outside the frame 40. A load-side terminal fitting TL is attached to an end of the second load-side electric wire WL2 (FIGS. 3 and 7 to 9). The additional load-side electrical connection structure 75B physically and electrically connects the load-side terminal fitting TL and the second terminal part 29*b* outside the frame 40. When there is a plurality of additional external loads L2, the additional load-side electrical connection structure 75B is provided for each additional external load L2.

The additional load-side electrical connection structure 75B adopts a connection structure in which the load-side terminal fitting TL of an end of the second load-side electric wire WL2 and the second terminal part 29*b* of the additional circuit protection component 29 are detachably and physically connected. The additional load-side electrical connection structure 75B illustrated here includes the same male screw member 76 and female screw member 77 as the load-side electrical connection structure 75A (FIGS. 7 and 8). The male screw portion of the male screw member 76 is inserted into the through hole TLa of the load-side terminal fitting TL of the second load-side electric wire WL2 and a through hole 29*d* of the second terminal part 29*b*. The additional load-side electrical connection structure 75B has a through hole 79*a* through which the male screw portion of the male screw member 76 is inserted, and includes a plate-like additional conductive member 79 that brings one of the load-side terminal fitting TL and the second terminal part 29*b* in which the male screw portion is inserted into the through holes TLa and 29*d* into surface contact (FIGS. 7 to 9). A resin portion 26 is integrally molded with the male screw member 76 and the additional conductive member 79. The resin portion 26 is integrally molded with the male screw member 76 and the additional conductive member 79 in a state where the contact surface of the additional conductive member 79 with which the load-side terminal fitting TL or the second terminal part 29*b* is in surface contact is exposed, and the male screw portion of the male screw member 76 inserted into the through hole 79*a* of the additional conductive member 79 is exposed.

In the additional load-side electrical connection structure 75B, the male screw portion of the male screw member 76 is inserted into the through hole 29*d* of the second terminal part 29*b* of the additional circuit protection component 29, the male screw portion is inserted into the through hole TLa of the load-side terminal fitting TL of the second load-side electric wire WL2, and the female screw member 77 is screwed into the male screw portion, whereby the load-side terminal fitting TL and the second terminal part 29*b* of the additional circuit protection component 29 are jointly fastened and fixed (FIG. 7). That is, the additional load-side electrical connection structure 75B is a jointly fastening/fixing structure in which the load-side terminal fitting TL and the second terminal part 29*b* are screwed and fixed by the male screw member 76 and the female screw member 77.

Here, in each of the additional power supply-side electrical connection structure 78 and the additional load-side electrical connection structure 75B, the male screw member 76 is arranged in a form in which the male screw portion protrudes toward the side opposite to the cylindrical wall 41*c* side of the cylindrical portion 41 (FIGS. 4 and 6 to 9). In the electrical junction box 1, the circuit protection component 20 is disposed in a state where the additional electrical connection portion 25*a* and the additional conductive member 79 are exposed to the side opposite to a side of the opposing wall body 41*f*. In the additional power supply-side electrical connection structure 78, the male screw member 76 is disposed such that the male screw portion protrudes from the through hole 25*b* of the additional electrical connection portion 25*a* to the opposite side of the opposing wall body 41*f*. That is, the additional power supply-side electrical connection structure 78 is a connection structure in which the first terminal part 29*a* of the additional circuit protection component 29 is detachably and physically connected to the additional electrical connection portion 25*a* of the circuit protection member 21 on the opposite side to the opposing wall body 41*f* side (in other words, a visible location outside the frame 40), and these can be screwed and fixed by the male screw member 76 and the female screw member 77 on the opposite side to the opposing wall body 41*f* side. In addition, in the additional load-side electrical connection structure 75B, the male screw member 76 is disposed such that the male screw portion protrudes from the through hole 79*a* of the additional conductive member 79 to the opposite side of the opposing wall body 41*f*. That is, the additional load-side electrical connection structure 75B is a connection structure in which the load-side terminal fitting TL at an end of the second load-side electric wire WL2 and the second terminal part 29*b* of the additional circuit protection component 29 are detachably and physically connected to the additional conductive member 79 on the opposite side to the opposing wall body 41*f* side (in other words, a visible location outside the frame 40), and the load-side terminal fitting TL and the second terminal part 29*b* can be screwed and fixed by the male screw member 76 and the female screw member 77 together with the additional conductive member 79 on the opposite side to the opposing wall body 41*f* side. Therefore, in each of the additional power supply-side electrical connection structure 78 and the additional load-side electrical connection structure 75B, the female screw member 77 is attached to and detached from the male screw member 76 while the circuit protection component 20 is assembled to the frame 40, so that the second load-side electric wire WL2 with the load-side terminal fitting TL and the additional circuit protection component 29 can be attached to and detached from the circuit protection component 20.

The additional power supply-side electrical connection structure 78 and the additional load-side electrical connection structure 75B of this example, the male screw member 76 is disposed such that a screw axis of the male screw portion in each structure is aligned with a direction orthogonal to the vertical direction (that is, the vehicle vertical direction), and the male screw portion in each structure protrudes toward a side opposite to the opposing wall body 41*f*.

In the circuit protection component 20, at least one combination of the additional electrical connection portion 25*a* and the additional load-side electrical connection structure 75B (in other words, a combination of the additional power supply-side electrical connection structure 78 and the additional load-side electrical connection structure 75B) is provided. That is, in the circuit protection component 20, when there is only one additional external load L2 to be added, one combination of the additional electrical connection portion 25*a* and the additional load-side electrical connection structure 75B (combination of the additional power supply-side electrical connection structure 78 and the additional load-side electrical connection structure 75B) may be provided. On the other hand, in the circuit protection component 20, when a plurality of the additional external load L2 to be added is scheduled, it is sufficient if the scheduled number or more of combination of the additional electrical connection portion 25*a* and the additional load-side electrical connection structure 75B (combination of the additional power supply-side electrical connection structure 78 and the additional load-side electrical connection structure 75B) are provided.

Note that, here, from the viewpoint of component sharing, the additional power supply-side electrical connection structure 78 and the additional load-side electrical connection structure 75B include the same male screw member 76 and female screw member 77 as the load-side electrical connection structure 75A, but the additional power supply-side electrical connection structure 78 and the additional load-side electrical connection structure 75B may be configured by male screw members and female screw members different from these. In addition, here, from the viewpoint of component sharing, the same load-side terminal fitting TL as the first load-side electric wire WL1 is attached to the second load-side electric wire WL2, but a load-side terminal fitting different from the load-side terminal fitting TL of the first load-side electric wire WL1 may be attached to an end of the second load-side electric wire WL2.

Specifically, the circuit protection component 20 is disposed outside the frame 40 as follows.

The frame 40 has a recess 42 in which the circuit protection component 20 is disposed by recessing an outer wall forming the outer frame toward the inside of the cylindrical portion 41 (FIGS. 2 to 4 and 12). The recess 42 desirably has a volume equal to or larger than the size of the circuit protection component 20 and can be accommodated without protruding the circuit protection component 20.

In addition, the frame 40 is provided with an opening 43*a* that opens in the same direction as the one opening 41*a* of the cylindrical portion 41, and has a sub-cylindrical portion 43 bulging out of the frame 40 outside the cylindrical portion 41 from the cylindrical wall 41*c* of the cylindrical portion 41 (FIGS. 1 to 4, 6, 11, and 12). The sub-cylindrical portion 43 is provided in the recess 42 of the frame 40. The sub-cylindrical portion 43 illustrated here is formed as a cylindrical body having both end openings (openings 43*a* and 43*b*). Therefore, in the sub-cylindrical portion 43, the one opening 43*a* is arranged on the one opening 41*a* side of the cylindrical portion 41, and the other opening 43*b* is arranged on the other opening 41*b* side of the cylindrical portion 41.

A power supply-side electrical connection structure 70 is provided in the inside of the sub-cylindrical portion 43. In the sub-cylindrical portion 43, the screw holding member 72 of the power supply-side electrical connection structure 70 is accommodated in the inside, and the male screw portion of the male screw member 71 in the power supply-side electrical connection structure 70 protrudes from the one opening 43*a*. Therefore, in the second electrical connection portion 62 of the internal conductive member 60, the male screw portion of the male screw member 71 protruding from the one opening 43*a* of the sub-cylindrical portion 43 is inserted into the through hole 62*a* on the one opening 41*a* side of the cylindrical portion 41 with respect to the one opening 43*a*. Therefore, the cylindrical wall 41*c* of the cylindrical portion 41 has a notch 44 that allows the inside of its own cylinder to communicate with the inside of the cylinder of the sub-cylindrical portion 43 and causes the second electrical connection portion 62 of the internal conductive member 60 to protrude to the outside of the frame 40 and outside the cylindrical portion 41 (FIGS. 4 and 11). The notch 44 is a notch obtained by cutting out the cylindrical wall 41*c* of the cylindrical portion 41 from the end portion on the other opening 41*b* side toward the one opening 41*a*, and is cut out towards the one opening 41*a* side of the cylindrical portion 41 with respect to the one opening 43*a* of the sub-cylindrical portion 43.

The block 30 has a protruding block portion 32 that protrudes from the notch 44 to the outside of the cylindrical portion 41 and is accommodated in the inside of the sub-cylindrical portion 43 (FIGS. 4 and 5). The screw holding member 72 is assembled to the protruding block portion 32, whereby the power supply-side electrical connection structure 70 is held.

In the electrical junction box 1, in a state where the internal conductive member 60 is held by the block body 31 and the power supply-side electrical connection structure 70 is held by the protruding block portion 32, the male screw portion of the male screw member 71 of the power supply-side electrical connection structure 70 is inserted into the through hole 62*a* of the second electrical connection portion 62 of the internal conductive member 60. In the electrical junction box 1, the block body 31 holding the internal conductive member 60 is inserted into the inside of the cylindrical portion 41 from the other opening 41*b*, and the protruding block portion 32 holding the power supply-side electrical connection structure 70 is inserted into the inside of the sub-cylindrical portion 43 from the other opening 43*b* together with the second electrical connection portion 62 of the internal conductive member 60. In the electrical junction box 1, the protruding block portion 32, the power supply-side electrical connection structure 70, and the second electrical connection portion 62 of the internal conductive member 60 are accommodated in the inside of the sub-cylindrical portion 43 in a state where the male screw portion of the male screw member 71 is taken out from the one opening 43*a* of the sub-cylindrical portion 43.

In the electrical junction box 1, the male screw portion of the male screw member 71 is inserted into the through hole 22*a* to assemble the power supply connection portion 22 of the circuit protection member 21 to the power supply-side electrical connection structure 70, and further, the male screw portion of the male screw member 71 is inserted into the through hole TBa to assemble the power supply-side terminal fitting TB to the power supply-side electrical connection structure 70. In the electrical junction box 1, the female screw member 73 is screwed into the male screw portion of the male screw member 71 to jointly fasten and fix the power supply-side terminal fitting TB, the second electrical connection portion 62 of the internal conductive member 60, and the power supply connection portion 22 of the circuit protection member 21. In the electrical junction box 1, the power supply-side terminal fitting TB and the circuit protection component 20 are assembled to the block 30 via the power supply-side electrical connection structure 70.

The one opening 43*a* of the sub-cylindrical portion 43 is covered with the first cover member 51 assembled to the frame 40 together with the power supply-side terminal fitting TB, the second electrical connection portion 62 of the internal conductive member 60, the power supply connection portion 22 of the circuit protection member 21, and the power supply-side electrical connection structure 70, and is accommodated in the first cover member 51. Further, the first cover member 51 covers the recess 42 of the frame 40, and houses the circuit protection component 20 in the recess 42 in the space between the recess 42 and the first cover member 51.

The other opening 43*b* of the sub-cylindrical portion 43 is closed by a closing portion 53 provided in the second cover member 52 assembled to the frame 40 so as not to be exposed to the outside of the frame 40 (FIGS. 1, 3, 6, and 13).

In the electrical junction box 1, all the core wires of the power supply-side electric wire WB, the first load-side electric wire WL1, and the second load-side electric wire WL2 may be formed of copper or a copper alloy. However, in order to reduce the weight of the power supply-side electric wire WB, the first load-side electric wire WL1, and the second load-side electric wire WL2, at least one core wire thereof is desirably formed of aluminum or an aluminum alloy. For example, all the core wires of the power supply-side electric wire WB, the first load-side electric wire WL1, and the second load-side electric wire WL2 may be formed of aluminum or an aluminum alloy, or at least one core wire may be formed of aluminum or an aluminum alloy, and the remaining core wires may be formed of copper or a copper alloy.

When the core wire of the power supply-side electric wire WB, the first load-side electric wire WL1, and the second load-side electric wire WL2 is molded using aluminum or an aluminum alloy, the weight of the power supply-side electric wire WB, the first load-side electric wire WL1, and the second load-side electric wire WL2 can be reduced as compared with a case where the core wire is molded using copper or a copper alloy. However, the power supply-side electric wire WB, the first load-side electric wire WL1, and the second load-side electric wire WL2 are thick and hard in response to a large current, and are difficult to bend. However, in the electrical junction box 1, the circuit protection component 20 is disposed outside the frame 40 and outside the cylinder of the cylindrical portion 41, and the power supply-side electric wire WB, the first load-side electric wire WL1, and the like, which are difficult to bend, are routed outside the frame 40. Therefore, the electrical junction box 1 can suppress an overload on the periphery in the housing due to the power supply-side electric wire WB or the like, and can improve the housing property of other electric wires in the inside of the cylindrical portion 41.

Specifically, the electrical junction box 1 illustrated here includes a first internal conductive member 60A and a second internal conductive member 60B as the internal conductive member 60, and the first internal conductive member 60A and the second internal conductive member 60B are held by the block 30 (FIGS. 4 and 5). Here, two types of first internal conductive members 60A are provided as the internal conductive members 60.

The circuit protection member 21 illustrated here includes a first power supply connection portion 22A and a second power supply connection portion 22B as the power supply connection portion 22, and the first power supply connection portion 22A and the second power supply connection portion 22B are electrically connected to the first power supply-side electric wire WB1 and the second power supply-side electric wire WB2 as the power supply-side electric wires WB, respectively (FIGS. 4, 7, and 10). In the circuit protection member 21, the first power supply connection portion 22A and the second power supply connection portion 22B are coupled by the coupling portion 25, and the fusible portion 24 is coupled to the first power supply connection portion 22A and the second power supply connection portion 22B via the coupling portion 25. That is, the fusible portion 24 is interposed between the first power supply connection portion 22A and the load connection portion 23, and is interposed between the second power supply connection portion 22B and the load connection portion 23. Further, in the circuit protection member 21, since the coupling portion 25 is provided with the additional electrical connection portion 25*a*, the additional electrical connection portion 25*a* is coupled to the first power supply connection portion 22A and the second power supply connection portion 22B.

The first power supply-side electric wire WB1 is interposed between the first power supply connection portion 22A and the external power supply B when viewed from the circuit protection member 21, and electrically connects the first power supply connection portion 22A to the external power supply B. The second power supply-side electric wire WB2 is electrically connected to an external electric component P such as an alternator or a DC-DC converter disposed outside the housing, and is electrically connected to the external power supply B via the circuit protection member 21 and the first power supply-side electric wire WB1. That is, the second power supply-side electric wire WB2 electrically connects the external electric component P to the external power supply B via the circuit protection member 21 and the first power supply-side electric wire WB1.

The first power supply connection portion 22A causes the first power supply-side electric wire WB1 to be electrically connected and causes the second electrical connection portion 62 of the first internal conductive member 60A to be physically and electrically connected. The electrical junction box 1 includes a first power supply-side electrical connection structure 70A as the power supply-side electrical connection structure 70 that electrically connects the first power supply-side electric wire WB1, the second electrical connection portion 62 of the first internal conductive member 60A, and the first power supply connection portion 22A of the circuit protection member 21 to each other (FIGS. 2 to 5 and 11). In the first power supply-side electrical connection structure 70A, the male screw portion of the male screw member 71 is inserted into the through holes TBa, 62*a*, and 22*a* provided in the power supply-side terminal fitting TB at an end of the first power supply-side electric wire WB1, the second electrical connection portion 62 of the first internal conductive member 60A, and the first power supply connection portion 22A of the circuit protection member 21, respectively, and the female screw member 73 is screwed into the male screw portion, whereby the power supply-side terminal fitting TB, the second electrical connection portion 62 of the first internal conductive member 60A, and the first power supply connection portion 22A of the circuit protection member 21 are jointly fastened and fixed. Here, the power supply-side terminal fitting TB, the second electrical connection portion 62 of each of the two first internal conductive members 60A, and the first power supply connection portion 22A of the circuit protection member 21 are jointly fastened and fixed.

The frame 40 illustrated here includes, as the sub-cylindrical portion 43, a first sub-cylindrical portion 43A provided with an opening (one opening 43*a*) that opens in the same direction as the one opening 41*a* of the cylindrical portion 41 (FIGS. 1 to 4, 6, and 12). In the first sub-cylindrical portion 43A, the first power supply-side electrical connection structure 70A is accommodated in the inside of the first sub-cylindrical portion 43A, and the male screw portion of the male screw member 71 in the first power supply-side electrical connection structure 70A protrudes from the one opening 43*a*. The first sub-cylindrical portion 43A is provided in the recess 42 of the frame 40. In the cylindrical wall 41*c* of the cylindrical portion 41, as the notch 44, there is provided a first notch 44A that allows the inside of its own cylinder to communicate with the inside of the cylinder of the first sub-cylindrical portion 43A and causes the second electrical connection portion 62 of the first internal conductive member 60A to protrude outside the frame 40 and outside the cylinder of the cylindrical portion 41 (FIG. 4). Then, as the protruding block portion 32 to which the screw holding member 72 of the first power supply-side electrical connection structure 70A is assembled, the block 30 is provided with a first protruding block portion 32A that protrudes from the first notch 44A to the outside of the cylindrical portion 41 and is accommodated in the inside of the first sub-cylindrical portion 43A (FIGS. 4 and 5).

In the electrical junction box 1, the first protruding block portion 32A, the first power supply-side electrical connection structure 70A, and the second electrical connection portion 62 of the two first internal conductive members 60A are accommodated in the inside of the first sub-cylindrical portion 43A in a state where the male screw portion of the male screw member 71 is taken out from the one opening 43*a* of the first sub-cylindrical portion 43A.

The second power supply connection portion 22B causes the second power supply-side electric wire WB2 to be electrically connected and causes the second electrical connection portion 62 of the second internal conductive member 60B to be physically and electrically connected. The electrical junction box 1 includes a second power supply-side electrical connection structure 70B as the power supply-side electrical connection structure 70 that electrically connects the second power supply-side electric wire WB2, the second electrical connection portion 62 of the second internal conductive member 60B, and the second power supply connection portion 22B of the circuit protection member 21 to each other (FIGS. 2 to 5). In the second power supply-side electrical connection structure 70B, the male screw portion of the male screw member 71 is inserted into the through holes TBa, 62*a*, and 22*a* provided in the power supply-side terminal fitting TB at an end of the second power supply-side electric wire WB2, the second electrical connection portion 62 of the second internal conductive member 60B, and the second power supply connection portion 22B of the circuit protection member 21, respectively, and the female screw member 73 is screwed into the male screw portion, whereby the power supply-side terminal fitting TB, the second electrical connection portion 62 of the second internal conductive member 60B, and the second power supply connection portion 22B of the circuit protection member 21 are jointly fastened and fixed.

The frame 40 illustrated here includes, as the sub-cylindrical portion 43, a second sub-cylindrical portion 43B provided with an opening (one opening 43*a*) that opens in the same direction as the one opening 41*a* of the cylindrical portion 41 (FIGS. 1 to 4, 6, and 12). In the second sub-cylindrical portion 43B, the second power supply-side electrical connection structure 70B is accommodated in the cylinder, and the male screw portion of the male screw member 71 in the second power supply-side electrical connection structure 70B protrudes from the one opening 43*a*. The second sub-cylindrical portion 43B is provided in the recess 42 of the frame 40. In the cylindrical wall 41*c* of the cylindrical portion 41, as the notch 44, there is provided a second notch 44B that allows the inside of its own cylinder to communicate with the inside of the cylinder of the second sub-cylindrical portion 43B and causes the second electrical connection portion 62 of the second internal conductive member 60B to protrude outside the frame 40 and outside the cylinder of the cylindrical portion 41 (FIG. 4). Then, as the protruding block portion 32 to which the screw holding member 72 of the second power supply-side electrical connection structure 70B is assembled, the block 30 is provided with a second protruding block portion 32B that protrudes from the second notch 44B to the outside of the cylindrical portion 41 and is accommodated in the inside of the second sub-cylindrical portion 43B (FIGS. 4 and 5).

In the electrical junction box 1, the second protruding block portion 32B, the second power supply-side electrical connection structure 70B, and the second electrical connection portion 62 of the second internal conductive members 60B are accommodated in the inside of the second sub-cylindrical portion 43B in a state where the male screw portion of the male screw member 71 is taken out from the one opening 43*a* of the second sub-cylindrical portion 43B.

In the electrical junction box 1, the male screw portion of the male screw member 71 of the first power supply-side electrical connection structure 70A is inserted into the through hole 22*a* of the first power supply connection portion 22A to assemble the first power supply connection portion 22A to the first power supply-side electrical connection structure 70A, and the male screw portion of the male screw member 71 of the second power supply-side electrical connection structure 70B is inserted into the through hole 22*a* of the second power supply connection portion 22B to assemble the second power supply connection portion 22B to the second power supply-side electrical connection structure 70B. Then, in the electrical junction box 1, the male screw portion of the male screw member 71 of the first power supply-side electrical connection structure 70A is inserted into the through hole TBa of the power supply-side terminal fitting TB of the first power supply-side electric wire WB1, and the power supply-side terminal fitting TB is assembled to the first power supply-side electrical connection structure 70A, and the male screw portion of the male screw member 71 of the second power supply-side electrical connection structure 70B is inserted into the through hole TBa of the power supply-side terminal fitting TB of the second power supply-side electric wire WB2, and the power supply-side terminal fitting TB is assembled to the second power supply-side electrical connection structure 70B. In the electrical junction box 1, the female screw members 73 are screwed into the male screw portions of the respective male screw members 71 to jointly fasten and fix the power supply-side terminal fitting TB of the first power supply-side electric wire WB1, the respective second electrical connection portions 62 of the two first internal conductive members 60A, and the first power supply connection portion 22A of the circuit protection member 21, and jointly fasten and fix the power supply-side terminal fitting TB of the second power supply-side electric wire WB2, the second electrical connection portion 62 of the second internal conductive member 60B, and the second power supply connection portion 22B of the circuit protection member 21. In the electrical junction box 1, the two power supply-side terminal fittings TB and the circuit protection component 20 are assembled to the block 30 via the first power supply-side electrical connection structure 70A and the second power supply-side electrical connection structure 70B.

One opening 43*a* of each of the first sub-cylindrical portion 43A and the second sub-cylindrical portion 43B is covered with the first cover member 51 together with the two power supply-side terminal fittings TB, the second electrical connection portions 62 of each of the two first internal conductive members 60A and the second internal conductive member 60B, the first power supply connection portion 22A and the second power supply connection portion 22B of the circuit protection member 21, the first power supply-side electrical connection structure 70A and the second power supply-side electrical connection structure 70B, and is housed in the first cover member 51.

The second cover member 52 includes, as the closing portion 53, a first closing portion 53A that closes the other opening 43*b* of the first sub-cylindrical portion 43A so as not to be exposed to the outside of the frame 40, and a second closing portion 53B that closes the other opening 43*b* of the second sub-cylindrical portion 43B so as not to be exposed to the outside of the frame 40 (FIGS. 1, 3, 6, and 13). The first closing portion 53A and the second closing portion 53B may be one plate-shaped wall portion that closes the other opening 43*b* from the outside of the frame 40 together with the first notch 44A and the second notch 44B, or may be formed of a plurality of wall portions that surrounds and covers the other opening 43*b* from the outside of the frame 40 together with the first notch 44A and the second notch 44B. Here, the first divided cover 52A is assembled to the peripheral edge of the other opening 41*b* of the cylindrical portion 41 provided with the first sub-cylindrical portion 43A and the second sub-cylindrical portion 43B. Therefore, the first closing portion 53A and the second closing portion 53B are provided in the first divided cover 52A.

As described above, since the circuit protection component 20 of the present embodiment can be retrofitted with the additional circuit protection component 29, when the additional external load L2 to be added is added, the additional circuit protection component 29 can be interposed between the additional external load L2 and the external power supply B. Therefore, the circuit protection component 20 can cope with the addition of the additional external load L2, and the overcurrent between the added additional external load L2 and the external power supply B can be cut off by the additional circuit protection component 29. In addition, the electrical junction box 1 of the present embodiment includes the circuit protection component 20 corresponding to the addition of the external load (additional external load L2), and can obtain the similar effect obtained by the circuit protection component 20.

Furthermore, in the electrical junction box 1 of the present embodiment, since the circuit protection component 20 is disposed outside the cylinder of the cylindrical portion 41 and outside the frame 40, it is possible to suppress the peripheral overload in the housing by the power supply-side electric wire WB (first power supply-side electric wire WB1 and second power supply-side electric wire WB2), the first load-side electric wire WL1, and the second load-side electric wire WL2 connected to the circuit protection component 20. In particular, in the electrical junction box 1, since the power supply-side electric wire WB (first power supply-side electric wire WB1 and second power supply-side electric wire WB2), the first load-side electric wire WL1, and the second load-side electric wire WL2 are less likely to bend as the electric wire diameter increases, it is possible to suppress an overload of the power supply-side electric wire WB and the like to the periphery in the housing. For example, in the electrical junction box 1, the deformation of the second cover member 52 can be suppressed by suppressing the overload on the second cover member 52 in the housing due to the power supply-side electric wire WB or the like. In addition, the electrical junction box 1 can improve the housing property of other electric wires in the inside of the cylindrical portion 41 by routing the power supply-side electric wire WB or the like that is difficult to bend outside the frame 40. In addition, in the electrical junction box 1, by routing the power supply-side electric wire WB and the like outside the frame 40, the heat generated by the power supply-side electric wire WB and the like does not stagnate in the housing, so that a temperature rise in the housing can be suppressed.

Since the circuit protection component according to the present embodiment can be retrofitted with the additional circuit protection component, when the additional external load to be added is added, the additional circuit protection component can be interposed between the additional external load and the external power supply. Therefore, the circuit protection component can cope with the addition of the additional external load, and the overcurrent between the added additional external load and the external power supply can be cut off by the additional circuit protection component. In addition, the electrical junction box according to the present embodiment includes the circuit protection component corresponding to the addition of the additional external load, and can obtain the similar effect obtained by the circuit protection component.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical junction box comprising:

an electronic component;

an internal conductive member that electrically connects the electronic component to an external power supply;

a frame including a cylindrical wall provided with an opening at least at one end, and having a cylindrical portion that houses and holds the electronic component and the internal conductive member in an inside of the cylindrical portion;

a cover member that closes the opening of the cylindrical portion; and a circuit protection component that is disposed outside the frame and outside a cylinder of the cylindrical portion, and cuts off an overcurrent between the external power supply and an external load, wherein the internal conductive member includes a first electrical connection portion and a second electrical connection portion that are physically and electrically connected to the electronic component in the inside of the cylindrical portion, the circuit protection component includes:

a conductive circuit protection member that is a member that cuts off an overcurrent between the external power supply and the external load between a power supply-side electric wire electrically connected to the external power supply and a first load-side electric wire electrically connected to the external load, and is capable of electrically connecting a first terminal part of an additional circuit protection component for cutting off an overcurrent between the external power supply and an additional external load to be added to the external power supply;

a power supply-side electrical connection structure that electrically connects the power supply-side electric wire, the internal conductive member, and the circuit protection member; and an additional load-side electrical connection structure that electrically connects a second load-side electrical wire electrically connected to the additional external load and a second terminal part of the additional circuit protection component, the circuit protection member includes a power supply connection portion that causes the power supply-side electric wire to be electrically connected and causes the second electrical connection portion of the internal conductive member to be physically and electrically connected, a load connection portion that causes the first load-side electric wire to be electrically connected, a fusible portion interposed between the power supply connection portion and the load connection portion, an additional electrical connection portion that causes the first terminal portion to be physically and electrically connected, and a coupling portion that couples the additional electrical connection portion to the power supply connection portion, and at least one set of a combination of the additional electrical connection portion and the additional load-side electrical connection structure is provided, the power supply-side electrical connection structure is a jointly fastening/fixing structure in which the power supply-side terminal fitting at an end of the power supply-side electric wire, the second electrical connection portion of the internal conductive member, and the power supply connection portion of the circuit protection member are screwed and fixed, and includes the male screw portion of the male screw member being inserted into the through-holes provided in the power supply-side terminal fitting, the second electrical connection portion of the internal conductive member, and the power supply connection portion of the circuit protection member, respectively, and the female screw member being screwed into the male screw portion of the male screw member, the frame has a recess in which the circuit protection component is disposed by recessing an outer wall forming the outer frame toward the inside of the cylindrical portion and a sub-cylindrical portion bulging out of the frame outside the cylindrical portion from the cylindrical wall of the cylindrical portion and provided in the recess, the sub-cylindrical portion has an inside of a cylinder that accommodates the screw holding member, and an opening that opens in a same direction as the one opening of the cylindrical portion and the male screw portion of the male screw member protrudes from the one opening, the cylindrical wall of the cylindrical portion has a notch that allows the inside of its own cylinder to communicate with the inside of the cylinder of the sub-cylindrical portion and causes the second electrical connection portion to protrude to the outside of the frame and outside the cylindrical portion, the one opening of the sub-cylindrical portion is covered with the cover member assembled to the frame together with the power supply-side terminal fitting, the second electrical connection portion, the power supply connection portion, and the power supply-side electrical connection structure, and is accommodated in the cover member, and the cover member covers the recess of the frame, and houses the circuit protection component in the recess in a space between the recess and the cover member.

2. The electrical junction box according to claim 1, further comprising an additional power supply-side electrical connection structure capable of electrically connecting the first terminal part of the additional circuit protection component and the additional electrical connection portion of the circuit protection member when the additional external load is added, wherein the additional power-side electrical connection structure is a connection structure that physically connects the first terminal part of the additional circuit protection component to the additional electrical connection portion of the circuit protection member, and the additional load-side electrical connection structure is a connection structure that physically connects a load-side terminal fitting at an end of the second load-side electric wire and the second terminal part of the additional circuit protection component.

3. The electrical junction box according to claim 1, further comprising an additional power supply-side electrical connection structure capable of electrically connecting the first terminal part of the additional circuit protection component and the additional electrical connection portion of the circuit protection member when the additional external load is added, wherein the additional power-side electrical connection structure is a jointly fastening/fixing structure for screwing and fixing the first terminal part and the additional electrical connection portion, and the additional load-side electrical connection structure is a jointly fastening/fixing structure for screwing and fixing a load-side terminal fitting at an end of the second load-side electric wire and the second terminal part of the additional circuit protection component.

* * * * *